US012811048B2

(12) United States Patent
Yoshida et al.

(10) Patent No.: US 12,811,048 B2
(45) Date of Patent: Nov. 24, 2026

(54) COIL COMPONENT

(71) Applicant: Murata Manufacturing Co., Ltd., Kyoto-fu (JP)

(72) Inventors: Takashi Yoshida, Nagaokakyo (JP); Takuya Ishida, Nagaokakyo (JP); Natsumi Yoshida, Nagaokakyo (JP); Yuki Nakamura, Nagaokakyo (JP); Shingo Nakamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 808 days.

(21) Appl. No.: 18/315,307

(22) Filed: May 10, 2023

(65) Prior Publication Data

US 2023/0368956 A1 Nov. 16, 2023

(30) Foreign Application Priority Data

May 11, 2022 (JP) ................................. 2022-078361

(51) Int. Cl.

| | |
|---|---|
| ***H01F 17/04*** | (2006.01) |
| ***H01F 27/28*** | (2006.01) |
| ***H01F 27/29*** | (2006.01) |
| *H01F 27/06* | (2006.01) |
| *H01F 37/00* | (2006.01) |

(52) U.S. Cl.

CPC ....... *H01F 17/045* (2013.01); *H01F 27/2823* (2013.01); *H01F 27/292* (2013.01); *H01F 27/06* (2013.01); *H01F 37/00* (2013.01)

(58) Field of Classification Search

CPC .................................................. H01F 27/2823
USPC ......................................................... 336/221
See application file for complete search history.

(56) References Cited

U.S. PATENT DOCUMENTS

| | | | | |
|---|---|---|---|---|
| 2020/0066435 | A1* | 2/2020 | Igarashi | H01F 27/2823 |
| 2020/0258678 | A1* | 8/2020 | Igarashi | H01F 17/045 |

FOREIGN PATENT DOCUMENTS

| | | | |
|---|---|---|---|
| DE | 10 2019 212 672 | A1 | 2/2020 |
| JP | 2012-089804 | A | 5/2012 |
| JP | 2020-031201 | A | 2/2020 |
| WO | 2015/045955 | A1 | 4/2015 |

* cited by examiner

*Primary Examiner* — Ronald Hinson
(74) *Attorney, Agent, or Firm* — Studebaker Brackett PLLC

(57) ABSTRACT

A coil component includes a drum core including a winding core portion, first and second flange portions, a first metal terminal attached to the first flange portion, and a first wire. The first flange portion is connected to a first end of the winding core portion in a direction along a central axis of the winding core portion. A first connection end of the first wire is joined to the first metal terminal, which has a bonding portion that is fixed to an outer end surface. The bonding portion has a facing surface and a recess that is recessed with respect to the facing surface and accommodates an adhesive. When viewed in a direction along a central axis, an area of a region of the recess facing the outer end surface is equal to or larger than an area of the facing surface.

7 Claims, 5 Drawing Sheets

COIL COMPONENT

CROSS-REFERENCE TO RELATED APPLICATION

This application claims benefit of priority to Japanese Patent Application No. 2022-078361, filed May 11, 2022, the entire content of which is incorporated herein by reference.

BACKGROUND

Technical Field

The present disclosure relates to a coil component.

Background Art

The coil component described in Japanese Patent Application Laid-Open No. 2012-89804 includes a winding core portion and two flange portions. The winding core portion has a quadrangular prism shape. The two flange portions are connected to both ends of the winding core portion. Each flange portion protrudes outward from the winding core portion in a direction orthogonal to a central axis of the winding core portion. The material of the winding core portion and the flange portion is a magnetic material. The winding core portion and the flange portion constitute a core of the coil component.

The coil component includes a plurality of metal terminals and two wires. An end of each wire is joined to each metal terminal. When a surface of each flange portion on a side opposite to the winding core portion is defined as an outer end surface, each metal terminal is fixed to the outer end surface of each flange portion with an adhesive.

SUMMARY

In the coil component described in Japanese Patent Application Laid-Open No. 2012-89804, as the amount of the adhesive interposed between the metal terminal and the flange portion increases, improvement of the bonding strength of the metal terminal to the flange portion can be expected. However, simply increasing the amount of the adhesive causes the adhesive to protrude to an unintended portion when the metal terminal is attached to the flange portion. Therefore, only increasing the amount of the adhesive does not lead to improvement of the bonding strength of the metal terminal.

Accordingly, the present disclosure provides a coil component including a drum core including a columnar winding core portion, a first flange portion connected to a first end of the winding core portion in a direction along a central axis of the winding core portion, and a second flange portion connected to a second end of the winding core portion opposite to the first end; a first metal terminal attached to the first flange portion; and a wire wound around the winding core portion and having a first connection end joined to the first metal terminal. When a direction from the first metal terminal toward the winding core portion in a direction along the central axis is defined as an inward direction, and a direction opposite to the inward direction is defined as an outward direction, the first flange portion has an outer end surface facing the outward direction side, the first metal terminal includes a bonding portion fixed to the outer end surface, and the bonding portion has a facing surface facing the outer end surface from the outward direction side, and a recess recessed with respect to the facing surface and accommodating an adhesive. When viewed in a direction along the central axis, an area of a region of the recess facing the outer end surface is equal to or larger than an area of the facing surface.

In the above configuration, the area obtained by adding the area of the region facing the outer end surface of the recess and the area of the facing surface is the area of the region facing the outer end surface of the first flange portion in the first metal terminal. According to the above configuration, the area of the region of the recess facing the outer end surface occupies ½ or more of the region of the first metal terminal facing the outer end surface of the first flange portion. By providing the recess over a wide range as described above, if a large amount of adhesive is applied, it is possible to prevent the adhesive from protruding out of the range of the recess. Further, since a large amount of adhesive can be accommodated in the recess, it is possible to expect improvement in bonding strength of the first metal terminal to the first flange portion.

The bonding strength of the metal terminal in the coil component is improved.

DETAILED DESCRIPTION

Hereinafter, an embodiment of a coil component will be described. The drawings may show enlarged components to facilitate understanding. The dimensional ratios of the components may be different from the actual ones or those in another drawing.

<Overall Configuration>

Figure 1:
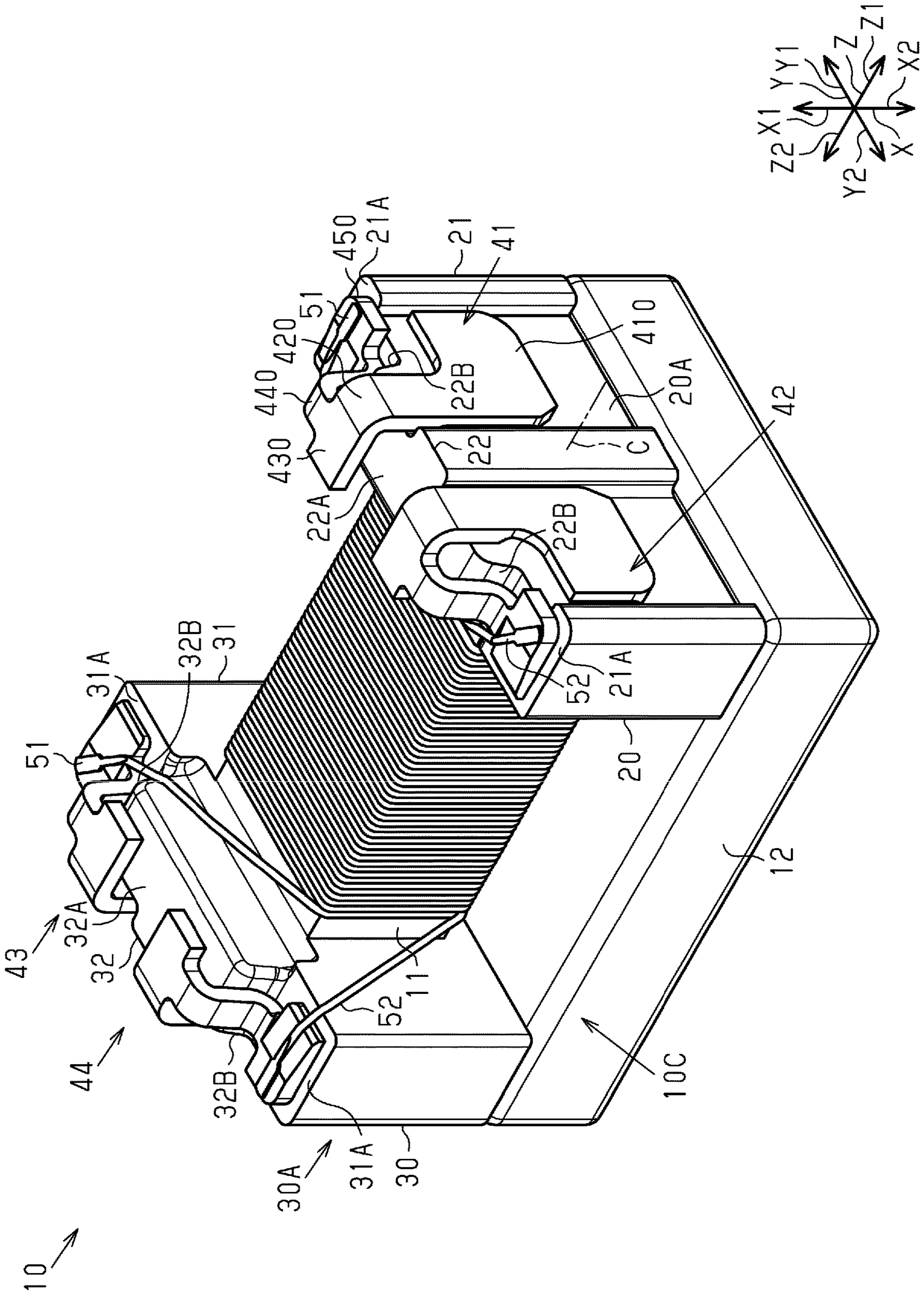
FIG. 1 is a perspective view of a coil component.

As illustrated in FIG. 1, a coil component 10 includes a drum core 10C and a top plate 12.

The drum core 10C includes a winding core portion 11, a first flange portion 20, and a second flange portion 30.

The winding core portion 11 has a quadrangular prism shape. The material of the winding core portion 11 is a non-conductive material. Specifically, the material of the winding core portion 11 can be, for example, alumina, Ni—Zn-based ferrite, resin, a mixture thereof, or the like.

The first flange portion 20 is connected to a first end of the winding core portion 11 in a direction along a central axis C. The second flange portion 30 is connected to a second end of the winding core portion 11 in the direction along the central axis C. The material of the first flange portion 20 and the second flange portion 30 is the same non-conductive material as the winding core portion 11. The first flange portion 20 and the second flange portion 30 are integrally molded with the winding core portion 11.

Here, a specific axis orthogonal to the central axis C is defined as a first axis X. In the present embodiment, the first axis X is parallel to two of the four sides of the winding core portion 11 when viewed in the direction along the central axis C. An axis orthogonal to both the central axis C and the first axis X is defined as a second axis Y. Further, in the present embodiment, an axis parallel to the central axis C is defined as a third axis Z. One of the directions along the first axis X is defined as a first positive direction X1, and a direction opposite to the first positive direction X1 is defined as a first negative direction X2. Similarly, one of the directions along the second axis Y is defined as a second positive direction Y1, and a direction opposite to the second positive direction Y1 is defined as a second negative direction Y2. One of the directions along the third axis Z is defined as a third positive direction Z1, and a direction opposite to the third positive direction Z1 is defined as a third negative direction Z2. In the present embodiment, a direction from the winding core portion 11 toward the first flange portion 20 is defined as a third positive direction Z1, and a direction from the winding core portion 11 toward the second flange portion 30 is defined as a third negative direction Z2.

The first flange portion 20 protrudes outward with respect to the winding core portion 11 in the direction along the first axis X and the direction along the second axis Y. The first flange portion 20 has a symmetrical shape in the direction along the second axis Y. The first flange portion 20 has an outer end surface 20A. The outer end surface 20A is a surface facing the third positive direction Z1 side among the outer surfaces of the first flange portion 20.

The first flange portion 20 includes a main body portion 21 and a protruding portion 22. The main body portion 21 has a quadrangular prism shape that is flat in the direction along the third axis Z as a whole. When viewed in the third negative direction Z2, the edge of the main body portion 21 on the first negative direction X2 side is parallel to the second axis Y. When viewed in the third negative direction Z2, the edge of the main body portion 21 on the first positive direction X1 side is parallel to the second axis Y. Therefore, the main body portion 21 has an upper surface 21A facing the first positive direction X1 side.

The protruding portion 22 protrudes from the upper surface 21A of the main body portion 21 toward the first positive direction X1. The protruding portion 22 has a quadrangular frustum shape in which the dimension in the direction along the second axis Y decreases toward the first positive direction X1. The protruding portion 22 is located substantially at the center of the main body portion 21 in the direction along the second axis Y. The dimension of the protruding portion 22 in the direction along the third axis Z is the same as the dimension of the main body portion 21 in the direction along the third axis Z.

The protruding portion 22 has an upper end surface 22A and two side surfaces 22B. The upper end surface 22A is a surface facing the first positive direction X1 side among the outer surfaces of the protruding portion 22. Each of the side surfaces 22B is a surface connecting the upper end surface 22A and the upper surface 21A of the main body portion 21. One of the side surfaces 22B faces the second positive direction Y1 side. The other one of the side surfaces 22B faces the second negative direction Y2 side. The main body portion 21 and the protruding portion 22 are integrally molded. That is, there is no clear boundary between the main body portion 21 and the protruding portion 22 inside the first flange portion 20.

The second flange portion 30 has a symmetrical shape with respect to the first flange portion 20 in the direction along the third axis Z. That is, the second flange portion 30 protrudes outward with respect to the winding core portion 11 in the direction along the first axis X and the direction along the second axis Y. The second flange portion 30 has an outer end surface 30A. The outer end surface 30A is a surface facing the third negative direction Z2 side among the outer surfaces of the second flange portion 30. The second flange portion 30 includes a main body portion 31 and a protruding portion 32. The configurations of the main body portion 31 and the protruding portion 32 are similar to those of the main body portion 21 and the protruding portion 22 of the first flange portion 20. That is, the main body portion 31 has an upper surface 31A facing the first positive direction X1 side. The protruding portion 32 has an upper end surface 32A and two side surfaces 32B.

In the present embodiment, the maximum dimension of the drum core 10C in the direction along the first axis X is 1.4 mm. The maximum dimension of the drum core 10C in the direction along the second axis Y is 2.5 mm. The maximum dimension of the drum core 10C in the direction along the third axis Z is 3.2 mm.

The top plate 12 has a rectangular plate shape. The top plate 12 is flat in the direction along the first axis X. The long side of the top plate 12 is parallel to the third axis Z. The short side of the top plate 12 is parallel to the second axis Y. The top plate 12 is located on the first negative direction X2 side with respect to the drum core 10C. The top plate 12 is connected to both the surface of the first flange portion 20 facing the first negative direction X2 and the surface of the second flange portion 30 facing the first negative direction X2. That is, the top plate 12 is bridged between the first flange portion 20 and the second flange portion 30. The material of the top plate 12 is the same non-conductive material as that of the drum core 10C.

The coil component 10 includes a first metal terminal 41, a second metal terminal 42, a third metal terminal 43, and a fourth metal terminal 44.

The first metal terminal 41 is attached to the first flange portion 20. The first metal terminal 41 is located on the second positive direction Y1 side with respect to the center of the first flange portion 20 in the direction along the second axis Y. The second metal terminal 42 is attached to the first flange portion 20. The second metal terminal 42 is located on the second negative direction Y2 side with respect to the center of the first flange portion 20 in the direction along the second axis Y. The third metal terminal 43 is attached to the second flange portion 30. The third metal terminal 43 is located on the second positive direction Y1 side with respect to the center of the second flange portion 30 in the direction along the second axis Y. The fourth metal terminal 44 is attached to the second flange portion 30. The fourth metal terminal 44 is located on the second negative direction Y2 side with respect to the center of the second flange portion 30 in the direction along the second axis Y. Details of the first metal terminal 41 to the fourth metal terminal 44 will be described later.

Figure 2:
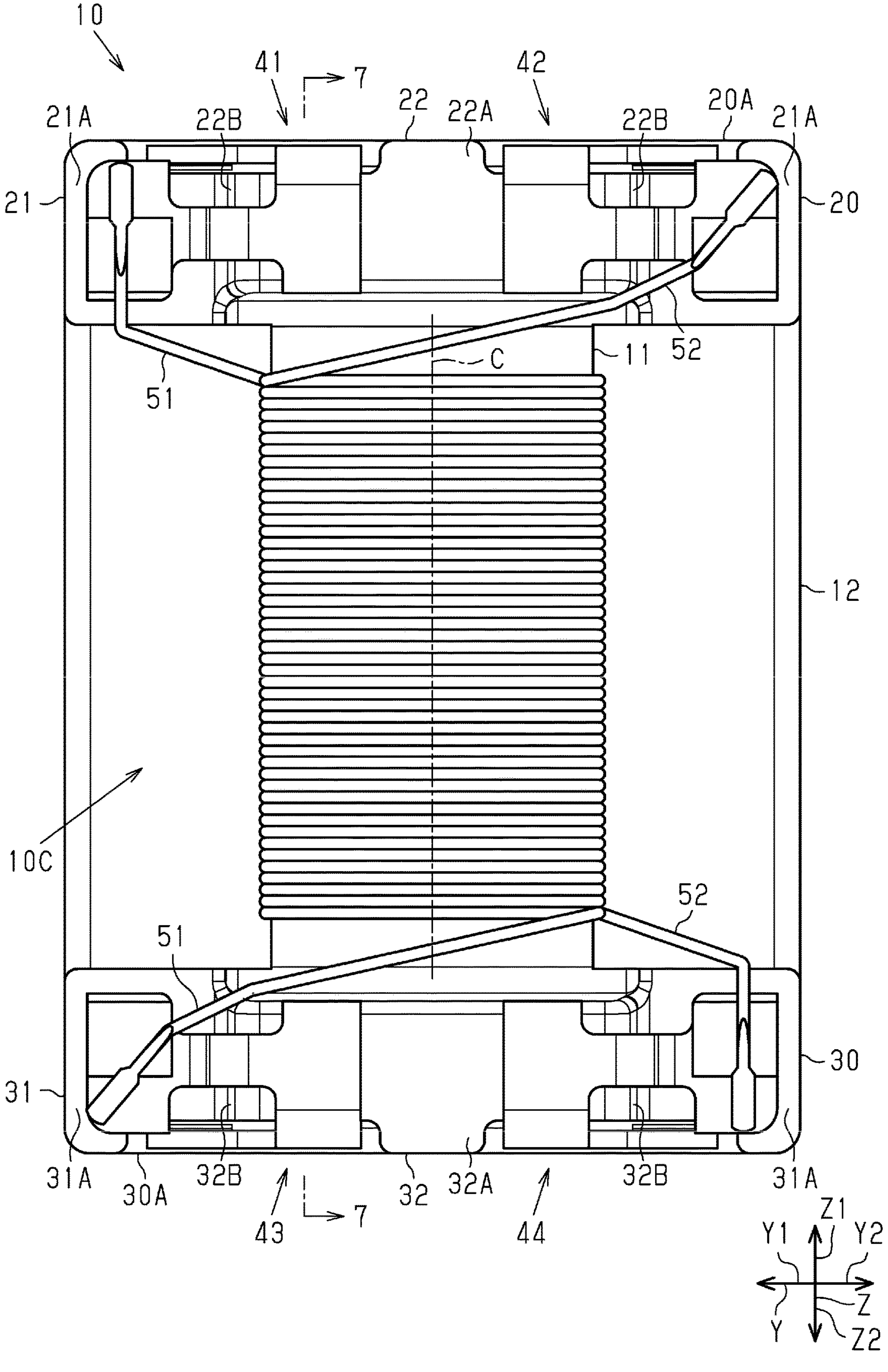
FIG. 2 is a plan view of the coil component.

As illustrated in FIG. 2, the coil component 10 includes a first wire 51 and a second wire 52. Although not illustrated, the first wire 51 includes a copper wire and an insulating film. The insulating film covers the outer surface of the copper wire. The first wire 51 has a substantially circular shape in a section orthogonal to the direction in which the first wire 51 extends. An outer diameter L1 of the first wire 51 is about 50 μm.

A first connection end of the first wire 51 is joined to the first metal terminal 41 by thermocompression bonding. The first wire 51 extends from the first metal terminal 41 toward the ridgeline of the winding core portion 11 on the first negative direction X2 side and the second positive direction Y1 side. When viewed in the third negative direction Z2, the first wire 51 is wound around the winding core portion 11 so as to travel clockwise as it goes toward the third negative direction Z2. A second connection end of the first wire 51 opposite to the first connection end extends toward the third metal terminal 43 from the ridgeline of the winding core portion 11 on the first positive direction X1 side and the second negative direction Y2 side. The second connection end of the first wire 51 is joined to the third metal terminal 43 by thermocompression bonding.

The thermocompression bonding is a method of sandwiching a wire between a metal terminal and a heated jig, and fixing the wire to the metal terminal while melting the wire. As a result of this fixing method, the insulating film is peeled off in the vicinity of the joining portion with the metal terminal in the wire, and the copper wire is exposed.

The second wire 52 has the same configuration as the first wire 51. That is, the second wire 52 includes a copper wire and an insulating film. An outer diameter L1 of the second wire 52 is about 50 μm.

A first connection end of the second wire 52 is joined to the second metal terminal 42 by thermocompression bonding. The second wire 52 extends from the second metal terminal 42 toward the ridgeline of the winding core portion 11 on the first positive direction X1 side and the second positive direction Y1 side. When viewed in the third negative direction Z2, the second wire 52 is wound around the winding core portion 11 so as to travel clockwise as it goes toward the third negative direction Z2. A second connection end of the second wire 52 opposite to the first connection end extends toward the fourth metal terminal 44 from the ridgeline of the winding core portion 11 on the first negative direction X2 side and the second negative direction Y2 side. The second connection end of the second wire 52 is joined the fourth metal terminal 44 by thermocompression bonding.

<First Metal Terminal>

Figure 6:
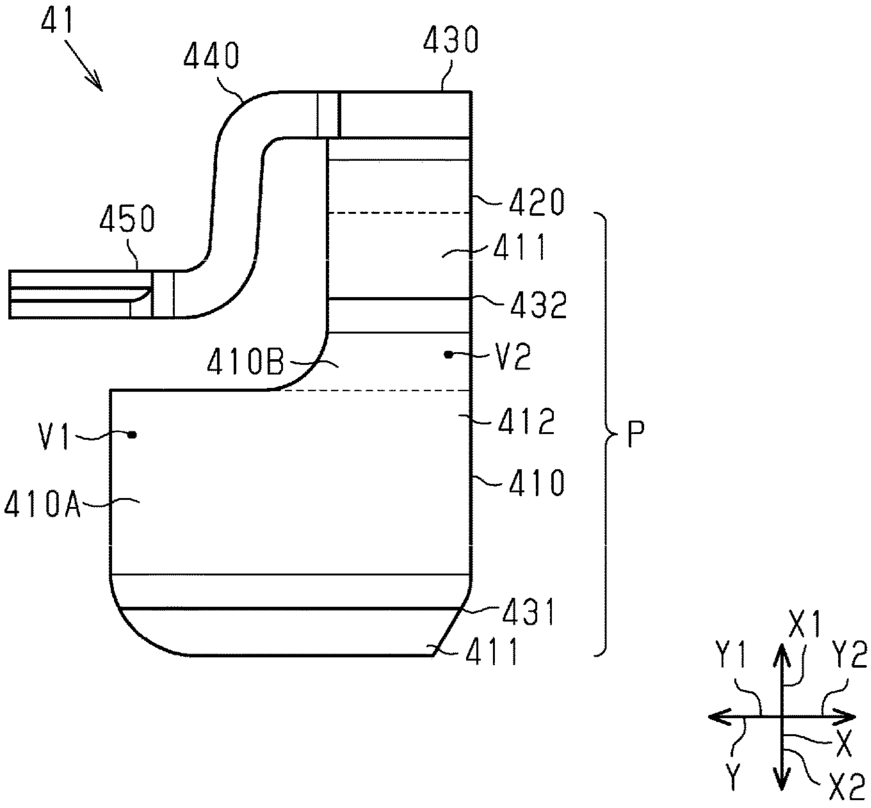
FIG. 6 is a front view of the first metal terminal in the coil component.

As illustrated in FIG. 6, the first metal terminal 41 includes a bonding portion 410, a coupling portion 420, a mounting portion 430, an extending portion 440, and a joining portion 450. The bonding portion 410, the coupling portion 420, the mounting portion 430, the extending portion 440, and the joining portion 450 are integrally molded. That is, there is no clear boundary between these members inside the first metal terminal 41.

In the following description, among the directions along the central axis C, a direction from each metal terminal toward the winding core portion 11 may be referred to as an inward direction, and a direction opposite to the inward direction may be referred to as an outward direction. For example, the inward direction from the first metal terminal 41 toward the winding core portion 11 coincides with the third negative direction Z2. The outward direction with reference to the first metal terminal 41 coincides with the third positive direction Z1.

<Bonding Portion>

Figure 7:
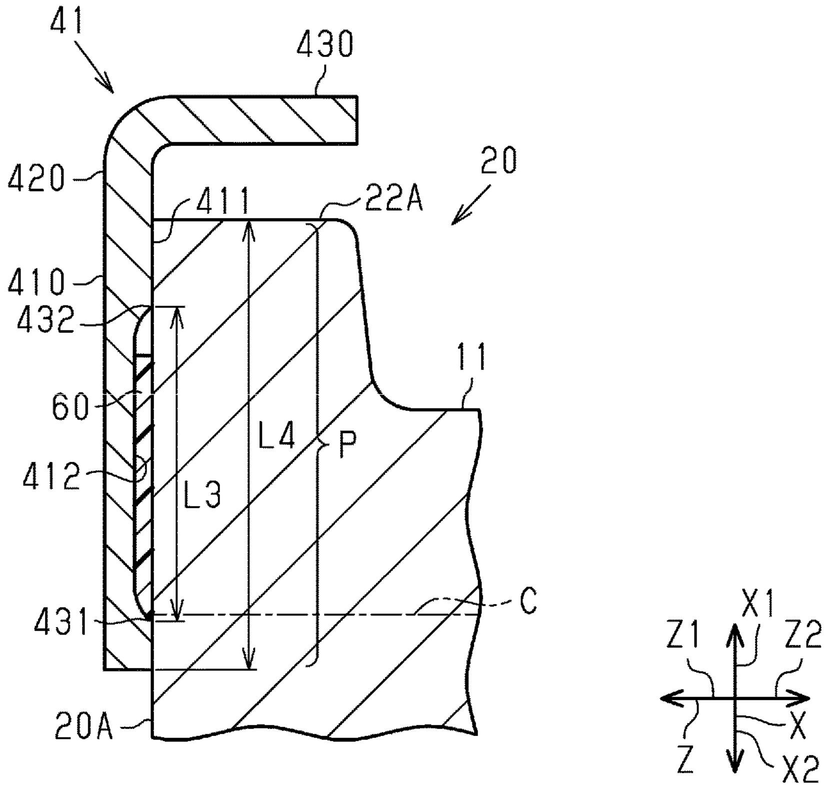
FIG. 7 is a view illustrating a part of an end view taken along line 7-7 in FIG. 2.

As illustrated in FIG. 1, the bonding portion 410 has a substantially plate shape. As illustrated in FIG. 7, the bonding portion 410 is fixed to the outer end surface 20A of the first flange portion 20 with an adhesive 60 interposed therebetween. That is, the bonding portion 410 is joined to a surface facing the third positive direction Z1 among the outer surfaces of the first flange portion 20. As described above, the bonding portion 410 is a portion of the first metal terminal 41 facing the outer end surface 20A of the first flange portion 20 from the third positive direction Z1 side.

As illustrated in FIG. 6, the bonding portion 410 has a facing surface 411 and a recess 412. As illustrated in FIG. 7, the facing surface 411 is a surface facing the outer end surface 20A from the third positive direction Z1 side except for the recess 412. That is, the facing surface 411 of the first metal terminal 41 is a surface facing the third negative direction Z2.

As illustrated in FIG. 6, the bonding portion 410 includes a wide portion 410A and a narrow portion 410B. The wide portion 410A is a part including an end of the bonding portion 410 in the first negative direction X2. The wide portion 410A has a substantially rectangular shape in which two adjacent corners on the first negative direction X2 side are chamfered when viewed in the third positive direction Z1. The dimension of the wide portion 410A in the direction along the second axis Y is substantially constant except for the chamfered portions. The wide portion 410A includes a portion having the largest dimension in the direction along the second axis Yin the facing surface 411 and the recess 412.

The narrow portion 410B is adjacent to the wide portion 410A on the first positive direction X1 side. Specifically, the narrow portion 410B extends in the first positive direction X1 from an end of the wide portion 410A in the second negative direction Y2. In FIG. 6, a boundary between the narrow portion 410B and the wide portion 410A is virtually indicated by a broken line. The narrow portion 410B has a smaller dimension in the direction along the second axis Y than the wide portion 410A. The dimension of the narrow portion 410B in the direction along the second axis Y is ½ or less of the dimension of the wide portion 410A in the direction along the second axis Y. The dimension of the narrow portion 410B in the direction along the second axis Y is substantially constant except for a coupling portion with the wide portion 410A.

As illustrated in FIG. 7, the recess 412 is recessed with respect to the facing surface 411. The adhesive 60 is accommodated in the recess 412. However, the adhesive 60 is not accommodated in a part of the recess 412 including an end in the first positive direction X1.

As illustrated in FIG. 6, the recess 412 is located across the wide portion 410A and the narrow portion 410B. The end 431 of the recess 412 on the first negative direction X2 side is located on the first positive direction X1 side with respect to the end of the bonding portion 410 in the first negative direction X2. That is, the recess 412 is not opened toward the end of the bonding portion 410 in the first negative direction X2. As illustrated in FIG. 7, the end 431 of the recess 412 on the first negative direction X2 side is located on the first negative direction X2 side as viewed from the central axis C.

An end 432 of the recess 412 on the first positive direction X1 side is located on the first negative direction X2 side with respect to the end of the bonding portion 410 in the first positive direction X1. That is, the end 432 of the recess 412 on the first positive direction X1 side is located on the first negative direction X2 side as viewed from the upper end surface 22A of the first flange portion 20. As illustrated in FIG. 7, the end 432 of the recess 412 on the first positive direction X1 side is located on the first positive direction X1 side as viewed from the end of the winding core portion 11 on the first positive direction X1 side.

As illustrated in FIG. 6, the recess 412 of the narrow portion 410B extends over the entire narrow portion 410B in the direction along the second axis Y. Further, the recess 412 of the wide portion 410A extends over the entire wide portion 410A in the direction along the second axis Y. That is, in the direction along the second axis Y, the maximum dimension of the recess 412 located in the wide portion 410A is larger than the maximum dimension of the narrow portion 410B.

The edge of the recess 412 on the first negative direction X2 side is substantially parallel to the second axis Y. The edge of the recess 412 on the first positive direction X1 side is substantially parallel to the second axis Y. The distance from the edge of the recess 412 on the first negative direction X2 side to the boundary line between the wide portion 410A and the narrow portion 410B is larger than the distance from the boundary line between the wide portion 410A and the narrow portion 410B to the edge of the recess 412 on the first positive direction X1 side. That is, the area of the portion of the recess 412 located in the wide portion 410A is larger than the area of the portion of the recess 412 located in the narrow portion 410B. In the present embodiment, the dimensional ratio between the wide portion 410A and the narrow portion 410B is about 5:2. The dimension of the wide portion 410A in the direction along the second axis Y is smaller than the dimension of the drum core 10C in the direction along the second axis Y. That is, the dimension of the wide portion 410A is 2.5 mm or less.

The dimension of the recess 412 in the direction along the third axis Z, that is, the depth of the recess 412 is substantially constant except for the edge of the recess 412. In the present embodiment, the depth of the recess 412 is approximately half the plate thickness of the bonding portion 410. For example, the plate thickness of the bonding portion 410 is 0.2 mm, and the depth of the recess 412 is 0.1 mm. Therefore, reflecting the above-described difference in area, the volume V1 of the portion of the recess 412 located in the wide portion 410A is larger than the volume V2 of the portion of the recess 412 located in the narrow portion 410B.

As illustrated in FIG. 7, a region where the facing surface 411 and the recess 412 are combined, that is, a region of the first metal terminal 41 facing the outer end surface 20A of the first flange portion 20 is defined as a facing region P. As illustrated in FIG. 6, when viewed in the direction along the central axis C, the area of the region of the recess 412 facing the outer end surface 20A of the first flange portion 20 is ½ or more of the facing region P. That is, the area of the region of the recess 412 facing the outer end surface 20A of the first flange portion 20 is equal to or larger than the area of the facing surface 411. Further, as illustrated in FIG. 7, the maximum dimension L3 of the recess 412 in the direction along the first axis X is ½ or more of the maximum dimension L4 of the facing region P in the direction along the first axis X. Note that "when viewed in the direction along the central axis C" is not limited to those that can be directly visually recognized, and includes a case where it is viewed while being transmitted as described above.

<Coupling Portion>

As illustrated in FIG. 7, the coupling portion 420 is connected to an end of the bonding portion 410 in the first positive direction X1. In FIG. 6, the boundary between the coupling portion 420 and the bonding portion 410 is virtually indicated by a broken line. The coupling portion 420 extends from the bonding portion 410 in the first positive direction X1. That is, the coupling portion 420 protrudes from the first flange portion 20 in the direction along the first axis X when viewed in the direction along the third axis Z. Specifically, the coupling portion 420 protrudes toward the first positive direction X1 side with respect to the upper end surface 22A of the first flange portion 20. The coupling portion 420 is bent by about 90 degrees on the way. An end of the coupling portion 420 opposite to the bonding portion 410 faces the third negative direction Z2.

<Mounting Portion>

Figure 4:
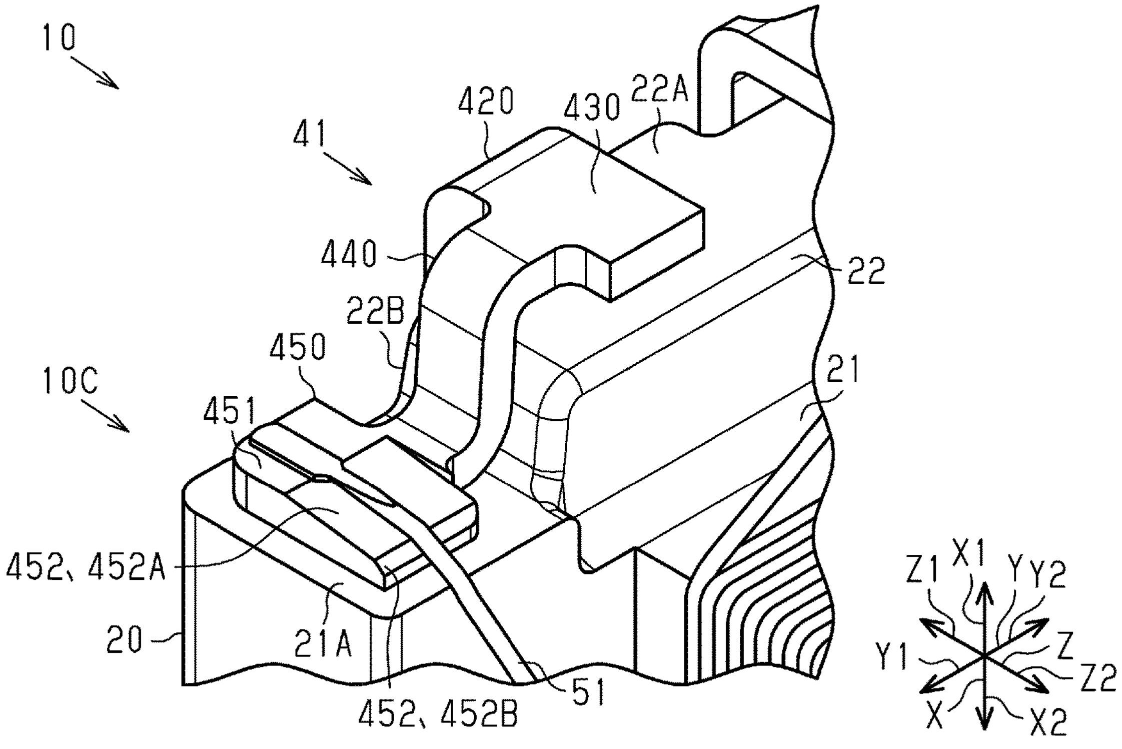
FIG. 4 is a perspective view of the vicinity of the first metal terminal in the coil component.

As illustrated in FIG. 4, the mounting portion 430 is connected to an end of the coupling portion 420 opposite to the bonding portion 410. The mounting portion 430 has a flat plate shape. The main surface of the mounting portion 430 is orthogonal to the first axis X. The mounting portion 430 is a portion of the first metal terminal 41 that is located closest to the first positive direction X1 side. The mounting portion 430 is separated from the upper end surface 22A of the first flange portion 20 on the first positive direction X1 side. That is, there is a gap between the mounting portion 430 and the upper end surface 22A. The mounting portion 430 is separated from any outer surface of the drum core 10C including the upper end surface 22A. The mounting portion 430 is a portion facing a substrate when the coil component 10 is mounted on the substrate.

Figure 5:
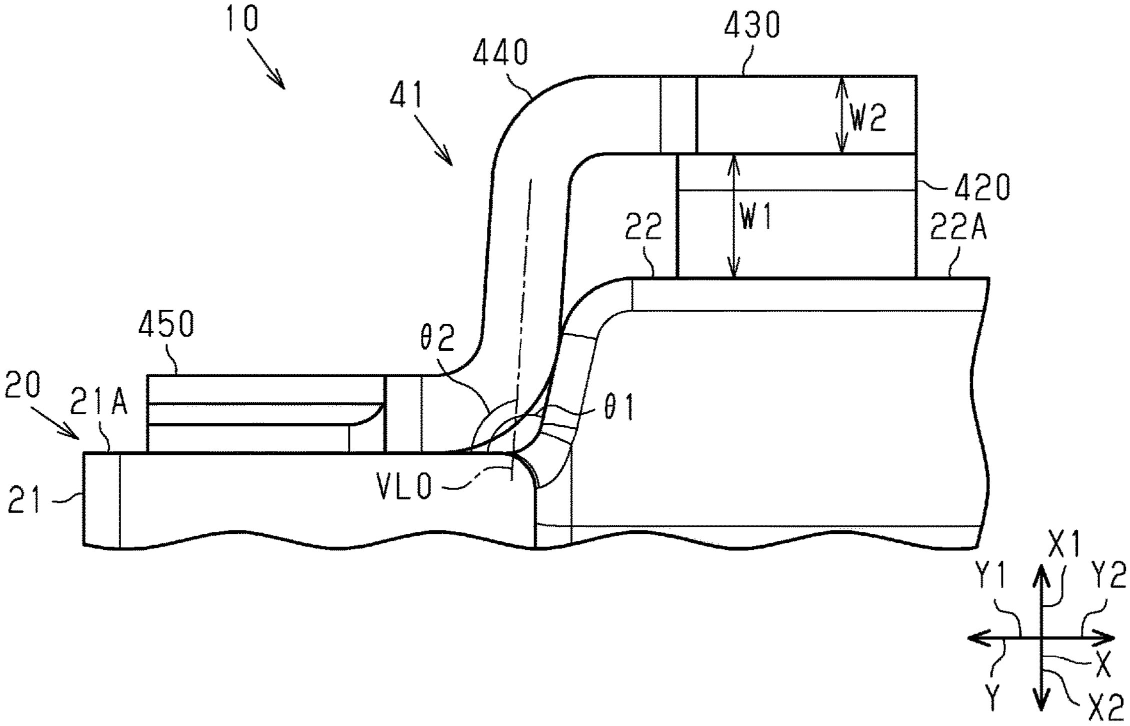
FIG. 5 is a front view of the vicinity of the first metal terminal in the coil component.

As illustrated in FIG. 5, the shortest distance W1 from the mounting portion 430 to the upper end surface 22A in the direction along the first axis X is larger than the minimum dimension W2 of the mounting portion 430 in the direction along the first axis X. In the present embodiment, the dimension of the mounting portion 430 in the direction along the first axis X is the plate thickness of the first metal terminal 41. The plate thickness is substantially constant. The plate thickness of the first metal terminal 41 is substantially constant at the bonding portion 410 excluding the recess 412, the coupling portion 420, the mounting portion 430, and the extending portion 440.

<Extending Portion>

As illustrated in FIG. 4, the extending portion 440 is connected to an end of the mounting portion 430 on the second positive direction Y1 side. The extending portion 440 extends substantially obliquely from the mounting portion 430 toward the second positive direction Y1 side and the first negative direction X2 side. The dimension of the extending portion 440 in the direction along the third axis Z, that is, the width dimension of the extending portion 440 is substantially constant. As illustrated in FIG. 5, when viewed in the direction along the third axis Z, the extending portion 440 extends so as to approach the side surface 22B of the protruding portion 22 facing the second positive direction Y1 side as it goes in the first negative direction X2. The surface of the extending portion 440 facing the second negative direction Y2 is in line contact with the side surface 22B of the protruding portion 22. When the extending portion 440 does not have a surface parallel to the side surface 22B, the extending portion 440 is in line contact with the side surface 22B.

As illustrated in FIG. 5, specifically, among the angles formed by the side surface 22B and the upper surface 21A when viewed in the third positive direction Z1, an angle on the second positive direction Y1 side and the first positive direction X1 side is defined as a first angle θ1. The extending portion 440 has a portion extending linearly. Among the angles formed by the imaginary line VL0 passing through the center of the linearly extending portion and the upper surface 21A, the angle on the second positive direction Y1 side and the first positive direction X1 side is defined as a second angle θ2. At this time, the second angle θ2 is smaller than the first angle θ1.

<Joining Portion>

Figure 3:
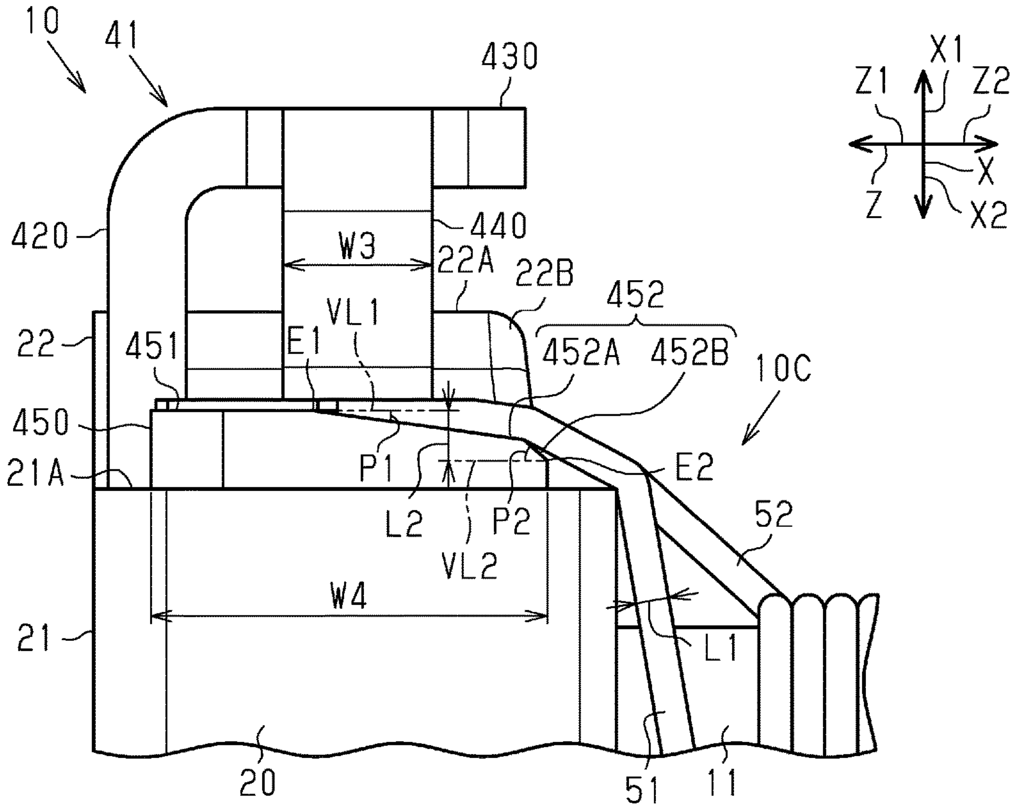
FIG. 3 is a side view of the vicinity of a first metal terminal in the coil component.

As illustrated in FIG. 4, the joining portion 450 is connected to an end of the extending portion 440 on the first negative direction X2 side. The joining portion 450 has a substantially plate shape. The joining portion 450 has a substantially rectangular shape elongated in the third axis Z direction when viewed in the direction along the first axis X. As illustrated in FIG. 3, the maximum dimension W4 of the joining portion 450 in the direction along the third axis Z is larger than the maximum dimension W3 of the extending portion 440 in the direction along the third axis Z, that is, the width dimension of the extending portion 440.

As illustrated in FIG. 4, the joining portion 450 faces the upper surface 21A of the first flange portion 20 from the first positive direction X1 side. A surface of the joining portion 450 facing the first negative direction X2 is in contact with the upper surface 21A. On the other hand, the surface of the joining portion 450 facing the first negative direction X2 is not fixed to the upper surface 21A. That is, the adhesive 60 and the like are not interposed between the surface of the joining portion 450 facing the first negative direction X2 and the upper surface 21A.

When viewed in the direction along the first axis X, the joining portion 450 does not protrude from the upper surface 21A of the first flange portion 20 in the third negative direction Z2. That is, the end of the upper surface 21A of the first flange portion 20 on the third negative direction Z2 side is located on the third negative direction Z2 side with respect to the end of the joining portion 450 on the third negative direction Z2 side.

The joining portion 450 has a horizontal surface 451 and an inclined surface 452. The horizontal surface 451 faces the first positive direction X1. The horizontal surface 451 is a surface located closest to the third positive direction Z1 side among the outer surfaces of the joining portion 450. When viewed in the direction along the first axis X, the horizontal surface 451 has a substantially rectangular shape.

The inclined surface 452 further has a first inclined surface 452A and a second inclined surface 452B. The first inclined surface 452A is a flat surface facing the first positive direction X1 side and the third negative direction Z2 side. The first inclined surface 452A is adjacent to the horizontal surface 451 on the third negative direction Z2 side. The first inclined surface 452A is located in the first negative direction X2 toward the third negative direction Z2.

The second inclined surface 452B is a flat surface facing the first positive direction X1 side and the third negative direction Z2 side. The second inclined surface 452B is adjacent to the first inclined surface 452A on the third negative direction Z2 side. The second inclined surface 452B is located in the first negative direction X2 toward the third negative direction Z2. The second inclined surface 452B reaches an end of the joining portion 450 on the third negative direction Z2 side.

As illustrated in FIG. 3, when viewed in the direction along the second axis Y, the virtual straight line VL1 passing through the end E1 of the first inclined surface 452A on the third positive direction Z1 side and parallel to the central axis C is drawn. An acute angle formed by the first inclined surface 452A and the virtual straight line VL1 is defined as an angle P1. When viewed in the direction along the second axis Y, the virtual straight line VL2 passing through the end E2 of the second inclined surface 452B on the third negative direction Z2 side and parallel to the central axis C is drawn. The acute angle formed by the second inclined surface 452B and the virtual straight line VL2 is defined as an angle P2. At this time, the angle P2 is larger than the angle P1.

Both the first inclined surface 452A and the second inclined surface 452B are flat surfaces. Therefore, the tangent at the end E1 of the first inclined surface 452A on the third positive direction Z1 side is a line extending on the first inclined surface 452A. Similarly, the tangent at the end E2 of the second inclined surface 452B on the third negative direction Z2 side is a line extending on the second inclined surface 452B.

In addition, the distance L2 in the direction along the first axis X from the end E1 of the inclined surface 452 in the third positive direction Z1 to the end E2 of the inclined surface 452 in the third negative direction Z2 is about 70 μm. That is, the distance L2 in the direction along the first axis X from the end E1 of the inclined surface 452 in the third positive direction Z1 to the end E2 of the inclined surface 452 in the third negative direction Z2 is larger than the outer diameter L1 of the first wire 51.

<Second Metal Terminal 42 to Fourth Metal Terminal 44>

As illustrated in FIG. 1, the second metal terminal 42 has a shape inverted in the direction along the second axis Y with respect to the first metal terminal 41. Similarly to the first metal terminal 41, the second metal terminal 42 is joined to the outer end surface 20A of the first flange portion 20 at the bonding portion 410. The third metal terminal 43 has the same shape as the second metal terminal 42. The third metal terminal 43 is joined to the outer end surface 30A of the second flange portion 30 at the bonding portion 410. The fourth metal terminal 44 has the same shape as the first metal terminal 41. The fourth metal terminal 44 is joined to the outer end surface 30A of the second flange portion 30 at the bonding portion 410.

<Joining of First Wire and Joining Portion>

When the first wire 51 is joined to the joining portion 450, the first connection end of the first wire 51 is disposed on the horizontal surface 451, and a jig is pressed parallel to the horizontal surface 451. The jig is a heater chip. The jig is in contact with the first wire 51 on the horizontal surface 451 and a part of the first wire 51 on the third positive direction Z1 side on the first inclined surface 452A. When the first wire 51 comes into contact with the jig, the insulating film in the first wire 51 melts. That is, in the entire first wire 51 on the horizontal surface 451 and a part of the first wire 51 on the first inclined surface 452A, the insulating film is peeled off, and the copper wire is exposed. Further, at the time of thermocompression bonding, the first wire 51 on the horizontal surface 451 is crushed and flattened by the load of the jig. Similarly, a part of the first wire 51 on the third positive direction Z1 side on the first inclined surface 452A in contact with the jig is flat. At the time of the thermocompression bonding, a part of the first wire 51 on the first inclined surface 452A and the first wire 51 on the second inclined surface 452B that do not come into contact with the jig are in a state where the insulating film remains. In addition, since the first wire 51 on the second inclined surface 452B does not come into contact with the jig, it is not flat.

OPERATION OF PRESENT EMBODIMENT

When the first metal terminal 41 is attached to the first flange portion 20, first, the adhesive 60 is applied to the outer end surface 20A. Then, the facing surface 411 is brought into contact with the outer end surface 20A so that the adhesive 60 is accommodated in the recess 412 in the first metal terminal 41. The recess 412 is disposed so that the first positive direction X1 side is hollow without the adhesive 60 adhering thereto. In this manner, the first metal terminal 41 is attached to the first flange portion 20.

Effects of Present Embodiment

The effects of the present embodiment will be described. Hereinafter, the effects of the first metal terminal 41 will be described as a representative, but the same effects are obtained in each metal terminal.

(1) According to the above embodiment, the area of the region of the recess 412 facing the outer end surface 20A is equal to or larger than the area of the facing surface 411. By providing the recess 412 over a wide range in this manner, if a large amount of adhesive 60 is applied, it is possible to prevent the adhesive 60 from protruding out of the range of the recess 412. In addition, since the large amount of adhesive 60 can be accommodated in the recess 412, improvement of the bonding strength of the first metal terminal 41 to the first flange portion 20 can be expected.

(2) In the above embodiment, the joining portion 450 is located on the second positive direction Y1 side with respect to the end of the narrow portion 410B on the second positive direction Y1 side. In the above embodiment, the mounting portion 430 is located on the second negative direction Y2 side with respect to the end of the recess 412 on the second positive direction Y1 side. Therefore, when the first wire 51 is crimped to the joining portion 450 and when the mounting portion 430 is attached to the substrate, a force in the rotation direction about the central axis C of the winding core portion 11 may act on the first metal terminal 41. According to the above embodiment, the maximum dimension of the recess 412 of the wide portion 410A in the direction along the second axis Y is larger than the maximum dimension of the narrow portion 410B in the direction along the second axis Y. That is, the recess 412 exists over a considerable length in the direction along the second axis Y. Therefore, when the force in the rotation direction acts on the first metal terminal 41, it is possible to suppress the first metal terminal 41 from being inclined with respect to the second axis Y.

(3) According to the above embodiment, the volume V1 of the portion of the recess 412 located in the wide portion 410A is larger than the volume V2 of the portion of the recess 412 located in the narrow portion 410B. According to this configuration, a large amount of adhesive 60 can be accommodated in the portion of the recess 412 located in the wide portion 410A. Therefore, when the force in the rotation direction about the central axis C acts as described above, the effect of preventing the first metal terminal 41 from being inclined with respect to the second axis Y can be more reliably exhibited.

(4) According to the above embodiment, the recess 412 extends over the entire wide portion 410A in the direction along the second axis Y. According to this configuration, as compared with the configuration in which the recess 412 does not extend over the entire wide portion 410A in the direction along the second axis Y, a larger amount of adhesive 60 can be accommodated in the wide portion 410A. Therefore, when the force in the rotation direction about the central axis C acts as described above, the effect of preventing the first metal terminal 41 from being inclined with respect to the second axis Y can be more reliably exhibited.

(5) In the above embodiment, the mounting portion 430 is located on the first positive direction X1 side with respect to the recess 412. Therefore, when the mounting portion 430 is attached to the substrate, a force in a rotation direction about an axis parallel to the second axis Y may act on the first metal terminal 41. In the above embodiment, the maximum dimension L3 of the 412 recesses in the direction along the first axis X is ½ or more of the maximum dimension L4 of the facing region P in the direction along the first axis X. According to this configuration, the recess 412 is provided over a considerable range in the direction along the first axis X. Therefore, when the force in the rotation direction acts on the end of the first metal terminal 41, the first metal terminal 41 is hardly peeled off from the first flange portion 20.

(6) In the above embodiment, the end 432 of the recess 412 on the first positive direction X1 side is located on the first negative direction X2 side as viewed from the end of the first flange portion 20 on the first positive direction X1 side. Therefore, the adhesive 60 accommodated in the recess 412 is accommodated between the first flange portion 20 and the recess 412. That is, it is difficult for the adhesive 60 to reach above the upper end surface 22A of the first flange portion 20. When the adhesive 60 does not exist on the upper end surface 22A, the mounting portion 430 of the first metal terminal 41 is not unintentionally joined to the upper end surface 22A.

The end 432 of the recess 412 on the first positive direction X1 side is located on the first positive direction X1 side as viewed from the end of the winding core portion 11 on the first positive direction X1 side. Therefore, when the force in the rotation direction about the second axis Y acts on the end of the first metal terminal 41, the first metal terminal 41 is hardly peeled off from the first flange portion 20.

(7) In the above embodiment, the end 431 of the recess 412 on the first negative direction X2 side is located in the first negative direction X2 as viewed from the central axis C. That is, according to this configuration, the recess 412 is provided over a considerable range in the direction along the first axis X. Therefore, when the force in the rotation direction about the second axis Y acts on the end of the first metal terminal 41, the first metal terminal 41 is hardly peeled off from the first flange portion 20.

(8) In the above embodiment, the adhesive 60 is not accommodated in a part of the recess 412 including the end 432 in the first positive direction X1. According to this configuration, since there is a space in which the adhesive 60 is not accommodated in the recess 412, the adhesive 60 hardly leaks from the recess 412. In particular, the adhesive 60 hardly leaks in the first positive direction X1 with respect to the recess 412. Therefore, the adhesive 60 hardly reaches above the upper end surface 22A of the first flange portion 20.

Modification

The present embodiment can be modified as follows. The present embodiment and the following modifications can be implemented in combination with each other within a range not technically contradictory. A modification common to the first metal terminal 41 to the fourth metal terminal 44 will be described only for the first metal terminal 41 as a representative.

In the above embodiment, the configuration of the coil component 10 is not limited. For example, the top plate 12 can be omitted from the coil component 10. The shape of the first flange portion 20 is not limited to the shape of the above embodiment. For example, the protruding portion 22 can be omitted from the first flange portion 20.

In the above embodiment, the second wire 52 may be omitted from the coil component 10. For example, when the coil component 10 includes only the first wire 51, one metal terminal may be attached to each flange portion.

In the above embodiment, the winding core portion 11 may not have a quadrangular prism shape. For example, the sectional shape of the winding core portion 11 may be a circular shape, an elliptical shape, or a polygonal shape other than a quadrangular shape.

In the above embodiment, the shape of the first metal terminal 41 is not limited to the example of the above embodiment. The first metal terminal 41 may have the facing surface 411 and the recess 412.

In the above embodiment, the joining portion 450 may be separated from the upper surface 21A. In addition, the adhesive 60 may be accommodated between the joining portion 450 and the upper surface 21A.

In the above embodiment, there may be no clear boundary between the first inclined surface 452A and the second inclined surface 452B in the joining portion 450. That is, the inclined surface 452 may be configured such that the inclination angle changes gently.

In the above embodiment, the configuration of the joining portion 450 is not limited to the example of the above embodiment. For example, the joining portion 450 may further include a second horizontal surface in addition to the horizontal surface 451.

In the above embodiment, the horizontal surface 451 can be omitted from the joining portion 450. That is, the joining portion 450 may include only the inclined surface 452. In this case, the first wire 51 is preferably joined to the inclined surface 452 at a portion of the inclined surface 452 closer to the outward direction. The joining portion 450 may further has an inclined surface in addition to the first inclined surface 452A and the second inclined surface 452B.

In the above embodiment, the angle P2 of the inclined surface 452 of the joining portion 450 may be smaller than the angle P1.

In the above embodiment, the inclined surface 452 of the joining portion 450 may include only one inclined surface. In addition, the inclined surface may be a curved surface instead of a flat surface. In the above embodiment, the joining portion 450 may not have the inclined surface 452 and may include only the horizontal surface 451.

In the above embodiment, the end of the upper surface 21A on the third negative direction Z2 side may be located on the third positive direction Z1 side with respect to the end of the joining portion 450 on the third negative direction Z2 side. That is, the joining portion 450 may protrude from the first flange portion 20.

In the above embodiment, the distance L2 in the direction along the first axis X from the end E1 of the inclined surface 452 in the third positive direction Z1 to the end E2 of the inclined surface 452 in the third negative direction Z2 may be smaller than or equal to the outer diameter L1 of the first wire 51.

In the above embodiment, the maximum dimension W3 of the extending portion 440 in the direction along the third axis Z may be larger than or the same as the maximum dimension W4 of the joining portion 450 in the direction along the third axis Z.

In the above embodiment, the position of the recess 412 is not limited to the example of the above embodiment. That is, the end 432 of the recess 412 on the first positive direction X1 side may be located on the first positive direction X1 side with respect to the end of the bonding portion 410 in the first positive direction X1. The end 431 of the recess 412 on the first negative direction X2 side may be located on the first positive direction X1 side as viewed from the central axis C.

Figure 8:
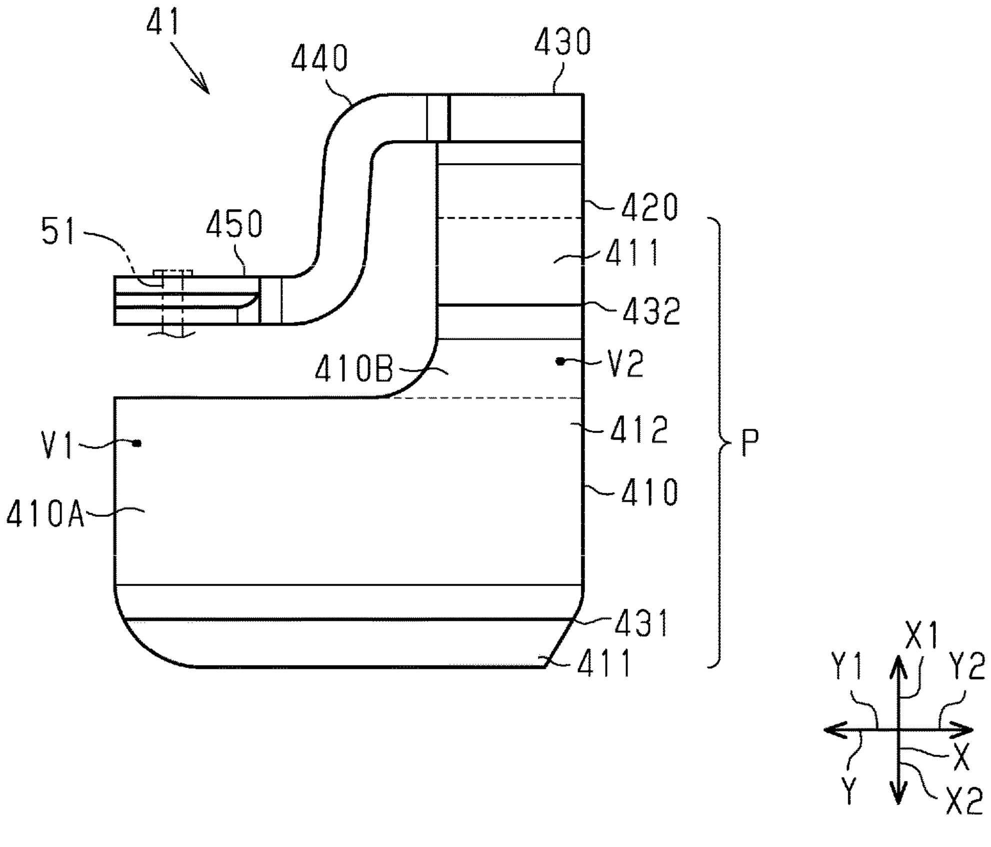
FIG. 8 is a view illustrating a modification of a bonding portion of a coil component.

In the above embodiment, the positional relationship between the fixing portion of the first wire 51 in the first metal terminal 41 and the recess 412 is not limited to the example of the above embodiment. For example, in the example illustrated in FIG. 8, the end of the wide portion 410A of the first metal terminal 41 in the second positive direction Y1 is at the same position as the end of the joining portion 450 in the second positive direction Y1 in the direction along the second axis Y. Therefore, the first connection end of the first wire 51 joined to the joining portion 450 is located within the range where the recess 412 exists in the direction along the second axis Y. According to this configuration, when the force in the rotation direction about the central axis C acts due to the load when crimping the first wire 51 to the joining portion 450, it is possible to suppress the first metal terminal 41 from being inclined with respect to the second axis Y.

In the above embodiment, the dimension of the bonding portion 410 in the direction along the second axis Y may be constant. That is, the bonding portion 410 may not be roughly divided into the wide portion 410A and the narrow portion 410B.

In the above embodiment, the recess 412 may not extend over the entire wide portion 410A in the direction along the second axis Y. Similarly, the recess 412 may not extend over the entire narrow portion 410B in the direction along the second axis Y. The volume V1 of the portion of the recess 412 located in the wide portion 410A may be smaller than or equal to the volume V2 of the portion of the recess 412 located in the narrow portion 410B.

In the above embodiment, the maximum dimension L3 of the recess 412 in the direction along the first axis X may be smaller than ½ of the maximum dimension L4 of the facing region P.

In the above embodiment, the adhesive 60 may be accommodated up to the end 432 of the recess 412 in the first positive direction X1. Further, the adhesive 60 may reach the facing surface 411 and the coupling portion 420.

In the above embodiment, the mounting portion 430 may be in contact with the upper end surface 22A of the protruding portion 22. That is, the mounting portion 430 may be in contact with the outer surface of the drum core 10C. In addition, the adhesive 60 may be applied between the mounting portion 430 and the protruding portion 22.

In the above embodiment, the shortest distance W1 from the mounting portion 430 to the upper end surface 22A may be smaller than or equal to the minimum dimension W2 of the mounting portion 430 in the direction along the first axis X.

In the above embodiment, the extending portion 440 may not be in contact with the side surface 22B. The extending portion 440 may extend away from the side surface 22B as it goes toward the first negative direction X2.

Technical ideas that can be derived from the above embodiments and modifications will be described below.

[1] A coil component including: a drum core including a columnar winding core portion, a first flange portion connected to a first end of the winding core portion in a direction along a central axis of the winding core portion, and a second flange portion connected to a second end of the winding core portion opposite to the first end; a first metal terminal attached to the first flange portion; and a wire wound around the winding core portion and having a first connection end joined to the first metal terminal. When a direction from the first metal terminal toward the winding core portion in a direction along the central axis is defined as an inward direction, and a direction opposite to the inward direction is defined as an outward direction, the first flange portion has an outer end surface facing a side of the outward direction, the first metal terminal includes a bonding portion fixed to the outer end surface, and the bonding portion has a facing surface facing the outer end surface from the outward direction side, and a recess recessed with respect to the facing surface and accommodating an adhesive. When viewed in a direction along the central axis, an area of a region of the recess facing the outer end surface is equal to or larger than an area of the facing surface.

[2] The coil component according to [1], in which when a specific axis orthogonal to the central axis is defined as a first axis, and an axis orthogonal to both the central axis and the first axis is defined as a second axis, the first metal terminal includes a wide portion and a narrow portion adjacent to the wide portion in a direction along the first axis and having a smaller dimension in a direction along the second axis than the wide portion, in which the recess is located in the wide portion and the narrow portion, and in which a maximum dimension of the recess located in the wide portion is larger than a maximum dimension of the narrow portion in the direction along the second axis.

[3] The coil component according to [2], in which a volume of a portion of the recess located in the wide portion is larger than a volume of a portion of the recess located in the narrow portion.

[4] The coil component according to [2] or [3], in which the recess extends over the entire wide portion in the direction along the second axis.

[5] The coil component according to any one of [1] to [4], in which when a specific axis orthogonal to the central axis is defined as a first axis, the first metal terminal includes a coupling portion that is connected to the bonding portion and protrudes from the first flange portion in a direction along the first axis, and in which when a region obtained by combining the facing surface and the recess is defined as a facing region, a maximum dimension of the recess in the direction along the first axis is ½ or more of a maximum dimension of the facing region in the direction along the first axis.

[6] The coil component according to any one of [1] to [5], in which when a specific axis orthogonal to the central axis is defined as a first axis, one of directions along the first axis is defined as a first positive direction, and a direction opposite to the first positive direction is defined as a first negative direction, the first metal terminal includes a coupling portion that is connected to the bonding portion and protrudes from the first flange portion in a direction along the first axis, an end of the recess on a side of the first positive direction is located on a side of the first negative direction as viewed from an end of the first flange portion on the side of the first positive direction, and is located on the side of the first positive direction as viewed from an end of the winding core portion on the side of the first positive direction, and an end of the recess on the side of the first negative direction is located in the first negative direction as viewed from the central axis.

[7] The coil component according to any one of [1] to [6], in which when a specific axis orthogonal to the central axis is defined as a first axis and a specific axis orthogonal to the central axis is defined as a second axis, the first metal terminal includes a coupling portion that is connected to the bonding portion and protrudes from the first flange portion in a direction along the first axis, and a first connection end of the wire is located within a range where the recess exists in a direction along the second axis.

[8] The coil component according to any one of [1] to [7], in which when a specific axis orthogonal to the central axis is defined as a first axis, and one of directions along the first axis is defined as a first positive direction, the first metal terminal includes a coupling portion that is connected to the bonding portion and protrudes from the first flange portion in a direction along the first axis, and the adhesive is not accommodated in a part of the recess including an end in the first positive direction.

What is claimed is:

1. A coil component comprising:

a drum core including a columnar winding core portion, a first flange portion connected to a first end of the winding core portion in a direction along a central axis of the winding core portion, and a second flange portion connected to a second end of the winding core portion opposite to the first end;

a first metal terminal attached to the first flange portion; and a wire wound around the winding core portion and having a first connection end joined to the first metal terminal, wherein when a direction from the first metal terminal toward the winding core portion in a direction along the central axis is defined as an inward direction, and a direction opposite to the inward direction is defined as an outward direction, the first flange portion includes an outer end surface facing a side of the outward direction, the first metal terminal includes a bonding portion fixed to the outer end surface of the first flange portion, and the bonding portion of the first metal terminal includes a facing surface facing the outer end surface of the first flange portion from the outward direction, and a recess recessed with respect to the facing surface and accommodating an adhesive, when viewed in a direction along the central axis, an area of a region of the recess facing the outer end surface is equal to or larger than an area of the facing surface, and when a specific axis orthogonal to the central axis is defined as a first axis, and an axis orthogonal to both the central axis and the first axis is defined as a second axis, the first metal terminal includes a wide portion and a narrow portion adjacent to the wide portion in a direction along the first axis and having a smaller dimension in a direction along the second axis than the wide portion, the recess is located in the wide portion and the narrow portion, and a maximum dimension of the recess located in the wide portion is larger than a maximum dimension of the narrow portion in the direction along the second axis.

2. The coil component according to claim 1, wherein a volume of a portion of the recess located in the wide portion is larger than a volume of a portion of the recess located in the narrow portion.

3. The coil component according to claim 1, wherein the recess extends over the entire wide portion in the direction along the second axis.

4. The coil component according to claim 1, wherein when a specific axis orthogonal to the central axis is defined as a first axis, the first metal terminal includes a coupling portion that is connected to the bonding portion and protrudes from the first flange portion in a direction along the first axis, and when a region obtained by adding the area of the facing surface and the area of the recess is defined as a facing region, a maximum dimension of the recess in the direction along the first axis is ½ or more of a maximum dimension of the facing region in the direction along the first axis.

5. The coil component according to claim 1, wherein when a specific axis orthogonal to the central axis is defined as a first axis, one of directions along the first axis is defined as a first positive direction, and a direction opposite to the first positive direction is defined as a first negative direction, the first metal terminal includes a coupling portion that is connected to the bonding portion and protrudes from the first flange portion in a direction along the first axis, an end of the recess on a side of the first positive direction is located on a side of the first negative direction as viewed from an end of the first flange portion on the side of the first positive direction, and is located on the side of the first positive direction as viewed from an end of the winding core portion on the side of the first positive direction, and an end of the recess on the side of the first negative direction is located in the first negative direction as viewed from the central axis.

6. The coil component according to claim 1, wherein when a specific axis orthogonal to the central axis is defined as a first axis and a specific axis orthogonal to the central axis is defined as a second axis, the first metal terminal includes a coupling portion that is connected to the bonding portion and protrudes from the first flange portion in a direction along the first axis, and a first connection end of the wire is located within a range where the recess exists in a direction along the second axis.

7. The coil component according to claim 1, wherein when a specific axis orthogonal to the central axis is defined as a first axis, and one of directions along the first axis is defined as a first positive direction, the first metal terminal includes a coupling portion that is connected to the bonding portion and protrudes from the first flange portion in a direction along the first axis, and the adhesive is not accommodated in a part of the recess including an end of the recess in the first positive direction.

* * * * *